Patented Nov. 1, 1938

2,135,349

UNITED STATES PATENT OFFICE 2,135,349

IMPREGNATION OF MATERIALS

Louis A. Meisse, Mansfield, Ohio, assignor to The Ohio Brass Company, Mansfield, Ohio, a corporation of New Jersey No Drawing. Application April 24, 1937, Serial No. 138,863

1 Claim. (Cl. 91—70)

This invention relates to a method of impregnation and to the resulting product and particularly to the impregnation of vulcanized fibre with artificial resin, such as the phenolic condensation product known in the trade as Bakelite.

One object of the invention is to provide an improved product by impregnating one material with another which heretofore could not be caused to penetrate the impregnated material.

A further object of the invention is to provide a method of impregnation which will permit the introduction of materials into solid bodies, which heretofore could not be penetrated by such materials.

A further object of the invention is to produce a substantially nonhygroscopic, vulcanized fibre which will resist the effects of weather conditions.

A further object of the invention is to provide an improved method of impregnation and a resulting improved product.

Other objects and advantages will appear from the following description. The invention is exemplified by the steps of the process and by the resulting product described in the following specification and it is more particularly pointed out in the appended claims.

Many materials, particularly fibrous materials have their characteristics greatly improved by impregnation by other materials. This form of treatment has heretofore been practiced by subjecting the solid, to be impregnated, to an impregnating liquid either at atmospheric pressure, or in some cases, at increased pressure or increased temperature or both. By these methods it has heretofore been impossible to cause some desirable impregnating materials to enter some forms of solids, due to the density of the solids and the size of the molecules or colloids of the treating material. The present invention makes it possible to treat certain materials which heretofore could not be penetrated with the desired impregnating substance.

In order to explain the invention more fully, its application to the treatment of vulcanized fibre by artificial resin will be described by way of example, although it will be understood that the invention may be applied to other impregnating substances and other treated materials.

Vulcanized fibre, an article of commerce, is made from unsized and uncalendered rag paper which is run through a bath of zinc chloride and wound in successive layers onto heated drums. The heat, in presence of the chloride, gelatinizes the cellulose fibre, thereby obliterating the laminar structure and creating a body of plastic character, lacking the original fibre structure. Complete gelatinization is arrested by lowering the temperature. The subsequent leaching process removes the zinc chloride. Normally, this material is dried and in this process shrinks to a hard bony mass. The material as heretofore produced is hygroscopic and swells upon subsequent absorption of moisture. The material is useful as an electrical insulator and for many other purposes, but the fact that it absorbs moisture is a serious objection to its use in many places where it otherwise would be decidedly useful.

Obviously, the impregnation of vulcanized fibre with a resinous material would greatly improve its characteristics but heretofore the ultra fine porosity of the material has prevented penetration of large sized molecules or colloids thereby filtering out all resinous material on the surface and permitting no penetration whatsoever. In the present invention a method has been found to penetrate the structure with a resin which is neither water soluble nor soluble in most instances in any commercial organic solvent. The process of the present invention is based on the fact that salts or electrolytes in a water solution permeate the vulcanized fibre structure in a manner similar to that of the original zinc chloride used during the manufacture of the vulcanized fibre. The particular application of the present invention involves the production of a resinous material by the interaction of two or more such water soluble salts or electrolytes, thereby circumventing the failure of colloids to penetrate. In the application of the invention water soluble salts which will interact by the application of heat to form resins are caused to penetrate into the fibrous body and the resin is formed in place within the body. In one particular application of the invention, by way of example, I use equal parts of phenol and formaldehyde in sufficient water to dissolve the phenol. Added to this is a small quantity, approximately 5%, of hexamethylenetetramine, which acts as an accelerator. The vulcanized fibre is immersed in this solution for a period of time depending upon the thickness to be penetrated. For instance, a one-quarter inch section is generally finished in six days, but heavier sections may take as long as six weeks. Upon removal of the fibre from this bath, the material is heated for the purpose of resinification of the salts. To prevent the formation of gases of either of the volatile constituents of the resin forming salts, or the formation of steam within the body of the fibre composition, I prefer to execute this resinification process in an autoclave under sufficient pressure to prevent the formation of gases.

For instance, I enclose the impregnated specimens in an autoclave at room temperature, and inject into the chamber, liquid carbon dioxide. On heating the chamber, the carbon dioxide evaporates and produces pressure of from 500 to 2000 pounds per square inch at approximately 350° F., depending on the amount of carbon dioxide present. I find that under such treatment the presence of an accelerator, such as hexamethylenetetramine or ammonia is not essential. Furthermore, I find that the carbon dioxide can be replaced by compressed ammonia, in which case ammonia acts as an accelerator as is known in the art.

After polymerization has taken place to form a nonvolatile resinous material, the specimens are removed from the autoclave and subjected to a slow kiln drying operation, heating with a high humidity atmosphere at elevated temperature but below 212° F. and gradually lowering the humidity to expel the water within the fibrous material.

After the fibre has been dried, it is subjected to heat sufficient to polymerize fully the resin contained in the fibre, or the fibre body is subjected to heat and pressure in order to form the body to the desired shape and simultaneously complete the polymerization of the resins to the insoluble state. The resulting material retains largely the physical characteristics of vulcanized fibre, has a substantially negligible degree of moisture absorption, is practically warp proof, and has improved dielectric strength. Its resistance to the electric arc is considerably superior to previous, molded organic bodies.

The present invention is not limited to the specific example described above, as a large variety of resinous bodies can be produced by the interaction of their basic constituents in water soluble salt form, and which permit resinification by the application of external heat. Additional examples of water soluble resin forming salts are: urea-formaldehyde, furfural-phenol, acetaldehyde, sulfur-terpenes, and many others.

I claim:

The method of forming electrical insulation comprising the steps of impregnating a body of vulcanized fibre with phenol and formaldehyde, enclosing the impregnated body in an autoclave together with carbon dioxide in a nongaseous form, heating the contents of the autoclave to approximately 350° F., thus vaporizing the carbon dioxide, the amount of carbon dioxide in the autoclave being sufficient to produce a pressure of from 500 to 2,000 pounds per square inch, continuing the heat and pressure in the autoclave to resinify the phenol and formaldehyde, removing the impregnated body from the autoclave, submitting the body to a drying operation and thereafter to heat and pressure to complete polymerization of the resin produced within the body.

LOUIS A. MEISSE.